UNITED STATES PATENT OFFICE.

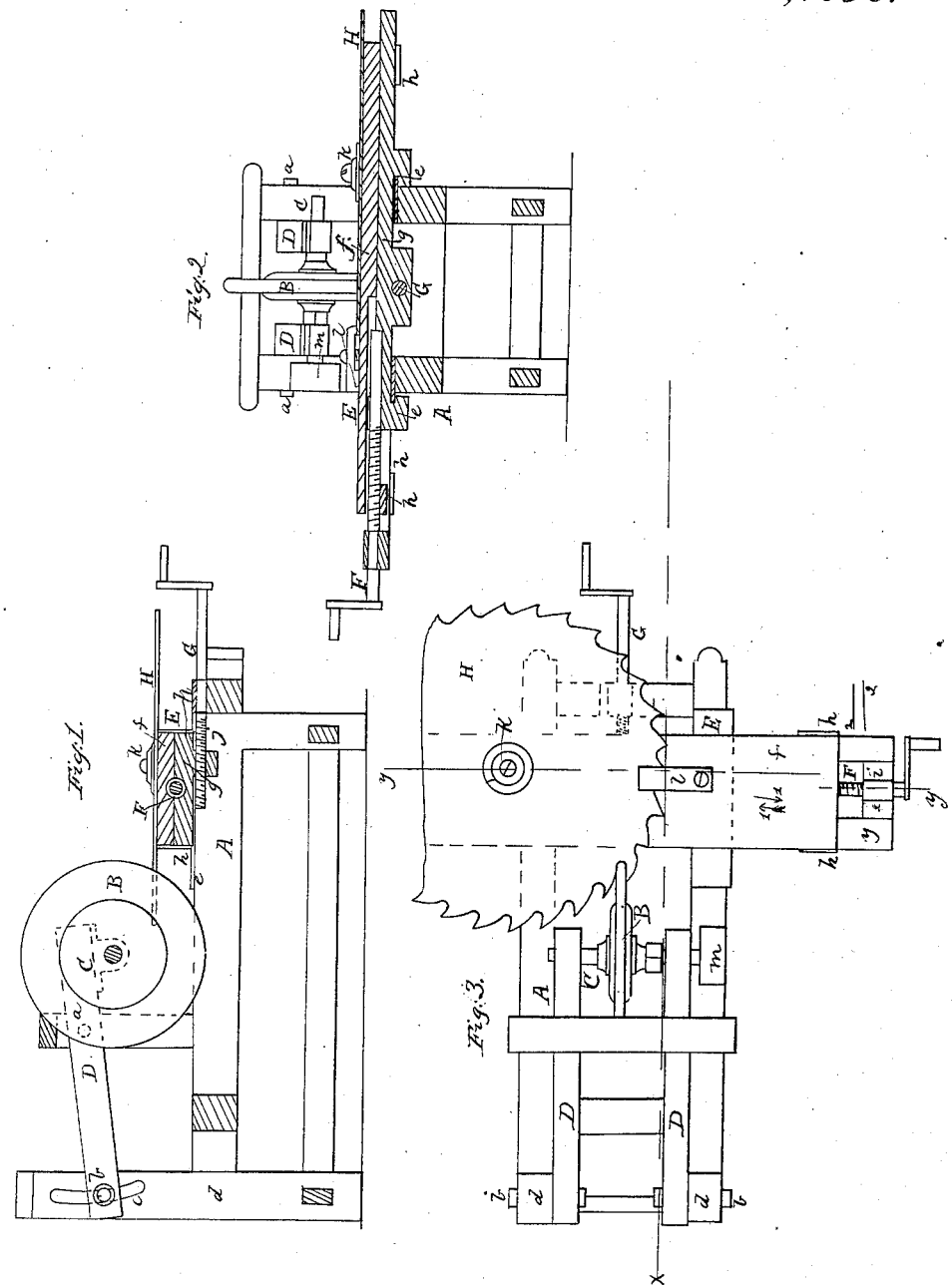

H. R. WOLFE, OF CONSOLATION, KENTUCKY, ASSIGNOR TO HIMSELF, DAVID STAPLES, AND W. H. WATSON, OF SAME PLACE.

SAW-GUMMER.

Specification of Letters Patent No. 21,729, dated October 5, 1858.

*To all whom it may concern:*

Be it known that I, HARVEY R. WOLFE, of Consolation, in the county of Shelby and State of Kentucky, have invented a new and Improved Device for Gumming Circular Saws; and I do hereby declare that the following is a full, clear, and exact description of the same, reference being had to the annexed drawings, making a part of this specification, in which—

Figure 1, is a longitudinal vertical section of my improvement taken in the line *x, x*, Fig. 3. Fig. 2, is a transverse vertical section of ditto taken in the line *y, y*, Fig. 3. Fig. 3, is a plan or top view of ditto.

Similar letters of reference indicate corresponding parts in the several figures.

This invention consists in the employment or use of an adjustable rotating grind stone and saw carriage arranged as hereinafter fully shown and described, whereby circular saws may be gummed with great facility, in a perfect manner and by any person of ordinary ability, but little skill being required to manage or manipulate the device.

To enable those skilled in the art to fully understand and construct my invention I will proceed to describe it.

A, represents a framing which may be constructed in any proper way to support the working parts.

B, is a grind stone, the shaft C, of which has its bearings attached to one end of parallel beams D, D, which are pivoted to the framing A, one at each side as shown at *a, a*. The opposite ends of these beams have each a set screw *b*, passing into them, said screws passing through curved slots *c, c*, in uprights *d, d*, of the framing. By means of these set screws the beams D, D, and consequently the stone B, may be adjusted higher or lower in the arc of a circle of which the pivots *a, a*, are the center. The periphery of the grind stone B, is rounded as shown clearly in Figs. 2 and 3.

E, represents a carriage which is fitted on the framing A, and on guides *e, e*. This carriage is formed of two parts *f, g*. Each part being an oblong rectangular plate or bed, the part *f* being placed on the part *g*, and fitted or secured on it by means of guides *h*, the part *f*, being allowed to slide on the part *g*. The arrows 1, Fig. 3, indicates the direction of the movement of the part *f*, on the part *g*. The part *g*, of the carriage is fitted on the guides *e, e*, on the framing A, and is allowed to move in the direction indicated by the arrows 2. The part *f*, of the carriage is moved by a screw rod F, which passes through a nut *h'*, attached to the under side of part *f*, the screw rod F, having its bearing *i*, on the part *g*, see Figs. 2 and 3. The part *g*, of the carriage is moved by a screw rod G, which passes through a nut *j*, attached to the underside of the part *g*, the screw rod G, having its bearing on the framing A.

The circular saw H, to be gummed out or operated upon is secured to the part *f*, of the carriage by a center screw *k*, and a clamp *l*, is attached to said part *f*, to hold the saw while being operated upon. The stone B, is properly adjusted and is rotated by means of a band which passes around a pulley *m*, on the shaft C. The saw H, is adjusted to the stone and fed toward it so that the latter will cut at the necessary spaces between the teeth by adjusting the parts *f, g*, of the carriage by means of the screw rods F, G, the saw while being acted upon being held by the clamp *l*. Every alternate space between the teeth is first gummed out, and the intermediate spaces afterward, the saw H, being turned and shifted during the latter operation to the left side of the saw, and the pulley *m*, placed on the opposite end of the shaft C. The object of this mode of operation is, that the saw H, is presented to the stone below its shaft and the base or inner end of the cut is consequently made oblique, and by turning the saw and gumming out the spaces alternately the spaces are provided with oblique inner edges in alternate positions. These oblique edges aid materially in cleaning the saw of dust allowing it to escape freely at either side of the saw.

This machine has been practically tested and it operates rapidly and well, without bending or injuring the saw in any way, and the machine may be managed or attended by any person of ordinary ability.

Having thus described my invention what I claim as new and desire to secure by Letters Patent, is—

The arrangement and combination of the stone B, adjustable beams D, screws (*b*), slots (*c*), and carriage E, as and for the purpose herein set forth and shown.

HARVEY R. WOLFE.

Witnesses:
 W. J. CAMPBELL,
 JOHN L. ZEIGLER.